United States Patent
Jiang et al.

(10) Patent No.: US 10,849,099 B2
(45) Date of Patent: Nov. 24, 2020

(54) METHOD AND DEVICE IN UE AND BASE STATION FOR WIRELESS COMMUNICATION

(71) Applicant: SHANGHAI LANGBO COMMUNICATION TECHNOLOGY COMPANY LIMITED, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/822,044

(22) Filed: Mar. 18, 2020

(65) Prior Publication Data

US 2020/0245290 A1 Jul. 30, 2020

Related U.S. Application Data

(63) Continuation of application No. PCT/CN2017/106687, filed on Oct. 18, 2017.

(51) Int. Cl.
*H04W 60/00* (2009.01)
*H04W 68/02* (2009.01)

(52) U.S. Cl.
CPC .................................. *H04W 68/02* (2013.01)

(58) Field of Classification Search
CPC ...... H04W 76/14; H04W 68/02; H04W 48/08
See application file for complete search history.

(56) References Cited

U.S. PATENT DOCUMENTS

| 8,073,459 | B2 * | 12/2011 | Voyer | H04W 60/04 |
| | | | | 455/456.1 |
| 2011/0171979 | A1 * | 7/2011 | Rune | H04W 24/02 |
| | | | | 455/458 |

FOREIGN PATENT DOCUMENTS

| CN | 101136826 A | 3/2008 |
| CN | 103733660 A | 4/2014 |
| CN | 104349374 A | 2/2015 |
| CN | 104471996 A | 3/2015 |
| CN | 105307131 A | 2/2016 |
| CN | 106797626 A | 5/2017 |

* cited by examiner

*Primary Examiner* — Gary Lafontant
(74) *Attorney, Agent, or Firm* — Maschoff Brennan

(57) ABSTRACT

The disclosure provides a method and a device in a User Equipment (UE) and a base station for wireless communication. The UE first receives first information, the first information indicating a first list and a second list, and then the UE monitors paging information in at least one of a first serving cell and a second serving cell; an area identifier corresponding to the first serving cell belongs to the first list, and an area identifier corresponding to the second serving cell belongs to the second list; and the first list and the second list can be updated separately. Through the designs of the first list and the second list and updating the first list and the second list separately, the disclosure improves the efficiency of mobility management at network side and the maintenance of tracking areas and reduces the complexity of paging design, and thus improves the overall performance.

16 Claims, 16 Drawing Sheets

UE

↓

Receiving first information, the first information indicating a first list and a second list

↓

Monitoring paging information in at least one of a first serving cell and a second serving cell

METHOD AND DEVICE IN UE AND BASE STATION FOR WIRELESS COMMUNICATION

CROSS REFERENCE TO RELATED APPLICATIONS

This application is a continuation of International Application No. PCT/CN2017/106687, filed on Oct. 18, 2017, claiming the priority benefit of International Application No. PCT/CN2017/106687, filed on Oct. 18, 2017, the full disclosure of which is incorporated herein by reference.

TECHNICAL FIELD

The disclosure relates to transmission methods and devices in wireless communication systems, and in particular to a transmission method and device for radio signals with long transmission delays.

BACKGROUND

At present, the study item to support non-terrestrial network in 5G New Radio Access Technology (5G NR) has been approved in $3^{rd}$ Generation Partner Project (3GPP) and relevant technologies will be discussed in October in 2017. In non-terrestrial network discussions, one important scenario is that a ground terminal directly accesses a spaceborne vehicle for communication; the spaceborne vehicle includes one or more of a Geostationary Earth Orbiting (GEO) satellite, a Medium Earth Orbiting (MEO) satellite, a Low Earth Orbit (LEO) satellite, a Highly Elliptical Orbiting (HEO) satellite or an airborne platform.

In present systems, a Mobility Management Entity (MME) corresponding to each UE maintains a Tracking Area (TA) list, the TA list includes multiple TAs, and each TA includes multiple base stations; when a UE moves between multiple base stations within one TA list, the UE does not have to update the corresponding MME in order to save signaling overheads and improve the efficiency of mobility management. In NTN application scenarios, when an orbit where the spaceborne vehicle is located is relatively high, the spaceborne vehicle will cover a huge number of UEs; if one spaceborne vehicle corresponds to one base station, the above mobility management based on one TA list is not applicable; therefore, the mobility management based on NTN application scenarios need to be designed again.

SUMMARY

In conventional mobility management, a system configures one TA list for a UE; when the UE moves between multiple base stations within the TA list, the UE does not have to update a corresponding MME; when a core network needs to find the above UE, the core network will page the above UE in the entire TA list. The above method has the following benefits: compared with the coverage of one base station, one TA list has a larger scope, which simplifies the design of MME and prevents the UE frequently interacting with the MME to update information of a base station to which the UE belongs.

The inventor finds through researches that, if the above method is directly used in NTN systems, two problems as follows will occur.

One NTN base station covers a very large area, and the TA list will not be updated even if a UE has a significant change in geographic location, which is not beneficial to tracking the actual position of the UE.

When one NTN base station needs to page a certain UE, all UEs under the coverage of the NTN base station are required to monitor paging information, which is particularly inefficient.

In view of the design, the disclosure provides a solution. It should be noted that the embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred.

The disclosure provides a method in a UE for wireless communication, wherein the method includes:

receiving first information, the first information indicating a first list and a second list; and monitoring paging information in at least one of a first serving cell and a second serving cell.

Herein, an area identifier corresponding to the first serving cell belongs to the first list, and an area identifier corresponding to the second serving cell belongs to the second list; the first list and the second list include Q1 area identifier(s) and Q2 area identifier(s) respectively, the Q1 and the Q2 are positive integers respectively; and the first list and the second list can be updated separately.

In one embodiment, the above method has the following benefits: two TA lists are maintained for the UE, that is, the first list and the second list, and the two lists can be updated separately; this method avoids the problem that NTN base stations and non-NTN base stations are included in one TA list to result in a decrease in efficiency of MME.

In one embodiment, the above method has another following benefit: the first list corresponds to non-NTN base stations, and the second list corresponds to NTN base stations; the first list and the second list hold responsible for different functions in an MME respectively, for example, the first list is used for tracking ground positions of a UE, the second list is used for updating service information specific to a satellite, similar to a satellite TV. The above method makes the maintenance of MME more reasonable and efficient.

According to one aspect of the disclosure, the above method includes:

receiving second information, the second information indicating a first area identifier; and judging at least one of whether the first area identifier belongs to the first list or whether the first area identifier belongs to the second list.

Herein, when the first area identifier is outside the first list, the receiving of the second information triggers a transmitting of third information; when the first area identifier is outside the second list, the receiving of the first information triggers a transmitting of fourth information.

In one embodiment, the above method has the following benefits: a transmitter of the second information is a target base station to which the UE moves; the UE acquires the TA identifier of the target base station through the second information, and then determines to update the TA identifier to the first list or the second list.

According to one aspect of the disclosure, the above method includes:

receiving fifth information.

Herein, the UE judges only one of whether the first area identifier belongs to the first list or whether the first area identifier belongs to the second list; and the fifth information is used for determining a judgment on whether the first area identifier belongs to the first list or a judgment on whether the first area identifier belongs to the second list.

In one embodiment, the above method has the following benefits: the fifth information indicates a base station type to which the target base station belongs, for example, indicating whether the target base station is an NTN base station or a non-NTN base station, thereby helping the UE add the first area identifier to a corresponding TA list.

In one embodiment, the above method has the following benefits: through the fifth information, the UE adds the new base station, to which the UE moves, to a proper TA list, thereby ensuring the first list and the second list to be updated separately.

According to one aspect of the disclosure, the above method includes:

transmitting target information; and receiving feedback information.

Herein, the target information is the third information, or the target information is the fourth information; the transmitting of the target information is used for triggering the receiving of the feedback information.

In one embodiment, the above method has the following benefits: the third information is used for updating the first list, and the fourth information is used for updating the second list; through separate designs of the third information and the fourth information, the first list and the second list can be updated separately.

According to one aspect of the disclosure, the above method includes:

determining a first time-frequency resource set and a second time-frequency resource set.

Herein, the UE monitors paging information in the first time-frequency resource set of the first serving cell and the second time-frequency resource set of the second serving cell respectively, location information of the UE is used for determining the first time-frequency resource set, and the second time-frequency resource set is unrelated to the location information of the UE.

In one embodiment, the above method has the following benefits: the first time-frequency resource set and the second time-frequency resource set are used for transmitting paging information from the first list and the second list respectively; time-frequency resources occupied by the paging information are grouped on physical layer.

In one embodiment, the above method has the following benefits: the first time-frequency resource set is used for transmitting paging information of the existing network, the second time-frequency resource set is used for transmitting paging information for NTN specific services, the above method improves the efficiency of paging and avoids awakening all UEs under the coverage of one NTN base station.

According to one aspect of the disclosure, the above method is characterized in that: the area identifier corresponding to the first serving cell is equal to the area identifier corresponding to the second serving cell.

In one embodiment, the above method has the following benefits: the first serving cell and the second serving cell share a same area identifier, that is, when the first list and the second list include one same area identifier, the first list and the second list still support separate update.

The disclosure provides a method in a first network equipment for wireless communication, wherein the method includes:

transmitting first information, the first information indicating a first list and a second list; and transmitting paging information in a first serving cell.

Herein, an area identifier corresponding to the first serving cell belongs to the first list, and an area identifier corresponding to a second serving cell belongs to the second list; the first list and the second list include Q1 area identifier(s) and Q2 area identifier(s) respectively, the Q1 and the Q2 are positive integers respectively; the first list and the second list can be updated separately; a receiver of the first information includes a first terminal; the first network equipment is related to the first serving cell.

In one embodiment, the first network equipment is an MME corresponding to the first terminal.

In one embodiment, the first network equipment is a first base station, and the first base station is a maintenance base station for the first serving cell.

According to one aspect of the disclosure, the above method includes:

receiving target information; and transmitting feedback information.

Herein, the target information is third information, or the target information is fourth information; the receiving of the target information is used for triggering the transmitting of the feedback information; when the first area identifier is outside the first list, the target information is the third information; when the first area identifier is outside the second list, the target information is the fourth information; the first list and the second list include Q1 area identifier(s) and Q2 area identifier(s) respectively, the Q1 and the Q2 are positive integers respectively; and the first list and the second list can be updated separately.

According to one aspect of the disclosure, the above method includes:

configuring a first time-frequency resource set.

Herein, the first terminal monitors paging information in the first time-frequency resource set of the first serving cell, and location information of the first terminal is used for determining the first time-frequency resource set.

According to one aspect of the disclosure, the above method is characterized in that: the area identifier corresponding to the first serving cell is equal to the area identifier corresponding to the second serving cell.

The disclosure provides a method in a second base station for wireless communication, wherein the method includes:

transmitting paging information in a second serving cell.

Herein, first information indicates a first list and a second list, an area identifier corresponding to a first serving cell belongs to the first list, and an area identifier corresponding to the second serving cell belongs to the second list; the first list and the second list include Q1 area identifier(s) and Q2 area identifier(s) respectively, the Q1 and the Q2 are positive integers respectively; the first list and the second list can be updated separately; a receiver of the first information includes a first terminal; a first network equipment is related to the first serving cell; and the first network equipment transmits the first information.

According to one aspect of the disclosure, the above method includes:

configuring a second time-frequency resource set.

Herein, the first terminal monitors paging information in the second time-frequency resource set of the second serving cell, and the second time-frequency resource set is unrelated to location information of the first terminal.

According to one aspect of the disclosure, the above method is characterized in that: the area identifier corresponding to the first serving cell is equal to the area identifier corresponding to the second serving cell.

The disclosure provides a method in a third base station for wireless communication, wherein the method includes:

transmitting second information, the second information indicating a first area identifier; and transmitting fifth information.

Herein, when the first area identifier is outside a first list, the third base station receives third information; when the first area identifier is outside a second list, the third base station receives fourth information; the first list and the second list include Q1 area identifier(s) and Q2 area identifier(s) respectively, the Q1 and the Q2 are positive integers respectively; the first list and the second list can be updated separately; and the fifth information is used for determining a judgment on whether the first area identifier belongs to the first list or a judgment on whether the first area identifier belongs to the second list.

According to one aspect of the disclosure, the above method includes:

receiving target information; and transmitting feedback information.

Herein, the target information is third information, or the target information is fourth information; and the receiving of the target information is used for triggering the transmitting of the feedback information.

The disclosure provides a UE for wireless communication, wherein the UE includes:

a first receiver, to receive first information, the first information indicating a first list and a second list; and a second receiver, to monitor paging information in at least one of a first serving cell and a second serving cell.

Herein, an area identifier corresponding to the first serving cell belongs to the first list, and an area identifier corresponding to the second serving cell belongs to the second list; the first list and the second list include Q1 area identifier(s) and Q2 area identifier(s) respectively, the Q1 and the Q2 are positive integers respectively; and the first list and the second list can be updated separately.

In one embodiment, the above UE for wireless communication is characterized in that: the UE further includes a first transceiver, the first transceiver receives second information, the second information indicating a first area identifier, and the first transceiver judges at least one of whether the first area identifier belongs to the first list or whether the first area identifier belongs to the second list; when the first area identifier is outside the first list, the receiving of the second information triggers a transmitting of third information; when the first area identifier is outside the second list, the receiving of the first information triggers a transmitting of fourth information.

In one subembodiment, the above UE for wireless communication is characterized in that: the first transceiver receives fifth information; the UE judges only one of whether the first area identifier belongs to the first list or whether the first area identifier belongs to the second list; and the fifth information is used for determining a judgment on whether the first area identifier belongs to the first list or a judgment on whether the first area identifier belongs to the second list.

In one subembodiment, the above UE for wireless communication is characterized in that: the first transceiver further transmits target information and receives feedback information; the target information is the third information, or the target information is the fourth information; the transmitting of the target information is used for triggering the receiving of the feedback information.

In one embodiment, the above UE for wireless communication is characterized in that: the second receiver determines a first time-frequency resource set and a second time-frequency resource set; the UE monitors paging information in the first time-frequency resource set of the first serving cell and the second time-frequency resource set of the second serving cell respectively, location information of the UE is used for determining the first time-frequency resource set, and the second time-frequency resource set is unrelated to the location information of the UE;

In one embodiment, the above UE for wireless communication is characterized in that: the area identifier corresponding to the first serving cell is equal to the area identifier corresponding to the second serving cell.

The disclosure provides a first network equipment for wireless communication, wherein the first network equipment includes:

a second transceiver, to transmit first information, the first information indicating a first list and a second list; and a first transmitter, to transmit paging information in a first serving cell.

Herein, an area identifier corresponding to the first serving cell belongs to the first list, and an area identifier corresponding to a second serving cell belongs to the second list; the first list and the second list include Q1 area identifier(s) and Q2 area identifier(s) respectively, the Q1 and the Q2 are positive integers respectively; the first list and the second list can be updated separately; a receiver of the first information includes a first terminal; the first network equipment is related to the first serving cell.

In one embodiment, the above first network equipment for wireless communication is characterized in that: the second transceiver further receives target information and transmits feedback information; the target information is third information, or the target information is fourth information; the receiving of the target information is used for triggering the transmitting of the feedback information; when the first area identifier is outside the first list, the target information is the third information; when the first area identifier is outside the second list, the target information is the fourth information; the first list and the second list include Q1 area identifier(s) and Q2 area identifier(s) respectively, the Q1 and the Q2 are positive integers respectively; and the first list and the second list can be updated separately.

In one embodiment, the above first network equipment for wireless communication is characterized in that: the first transmitter configures a first time-frequency resource set; the first terminal monitors paging information in the first time-frequency resource set of the first serving cell, and location information of the first terminal is used for determining the first time-frequency resource set.

In one embodiment, the above first network equipment for wireless communication is characterized in that: the area identifier corresponding to the first serving cell is equal to the area identifier corresponding to the second serving cell.

The disclosure provides a second base station for wireless communication, wherein the second base station includes:

a second transmitter, to transmit paging information in a second serving cell.

Herein, first information indicates a first list and a second list, an area identifier corresponding to a first serving cell belongs to the first list, and an area identifier corresponding to the second serving cell belongs to the second list; the first list and the second list include Q1 area identifier(s) and Q2 area identifier(s) respectively, the Q1 and the Q2 are positive integers respectively; the first list and the second list can be updated separately; a receiver of the first information includes a first terminal; a first network equipment is related to the first serving cell; and the first network equipment transmits the first information.

In one embodiment, the above second base station for wireless communication is characterized in that: the second transmitter configures a second time-frequency resource set; the first terminal monitors paging information in the second time-frequency resource set of the second serving cell, and the second time-frequency resource set is unrelated to location information of the first terminal.

In one embodiment, the above second base station for wireless communication is characterized in that: the area identifier corresponding to the first serving cell is equal to the area identifier corresponding to the second serving cell.

The disclosure provides a third base station for wireless communication, wherein the third base station includes:

a third transceiver, to transmit second information, the second information indicating a first area identifier, and to transmit fifth information.

Herein, when the first area identifier is outside a first list, the third base station receives third information; when the first area identifier is outside a second list, the third base station receives fourth information; the first list and the second list include Q1 area identifier(s) and Q2 area identifier(s) respectively, the Q1 and the Q2 are positive integers respectively; the first list and the second list can be updated separately; and the fifth information is used for determining a judgment on whether the first area identifier belongs to the first list or a judgment on whether the first area identifier belongs to the second list.

In one embodiment, the above third base station for wireless communication is characterized in that: the third transceiver receives target information and transmits feedback information; the target information is third information, or the target information is fourth information; and the receiving of the target information is used for triggering the transmitting of the feedback information.

In one embodiment, compared with conventional schemes, the disclosure has the following advantages.

Two TA lists are maintained for the UE, that is, the first list and the second list, and the two lists can be updated separately; this method avoids the problem that NTN base stations and non-NTN base stations are included in one TA list to result in a decrease in efficiency of MME.

The first list corresponds to non-NTN base stations, and the second list corresponds to NTN base stations; the first list and the second list hold responsible for different functions in an MME respectively, for example, the first list is used for tracking ground positions of a UE, the second list is used for updating service information specific to a satellite, similar to a satellite TV. The above method makes the maintenance of MME more reasonable and efficient.

Through the fifth information, the UE adds the new base station, to which the UE moves, to a proper TA list, thereby ensuring the first list and the second list to be updated separately.

The first time-frequency resource set and the second time-frequency resource set are used for transmitting paging information from the first list and the second list respectively; time-frequency resources occupied by the paging information are grouped on physical layer. The first time-frequency resource set is used for transmitting paging information of the existing network, the second time-frequency resource set is used for transmitting paging information for NTN specific services, the above method improves the efficiency of paging and avoids awakening all UEs under the coverage of one NTN base station.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
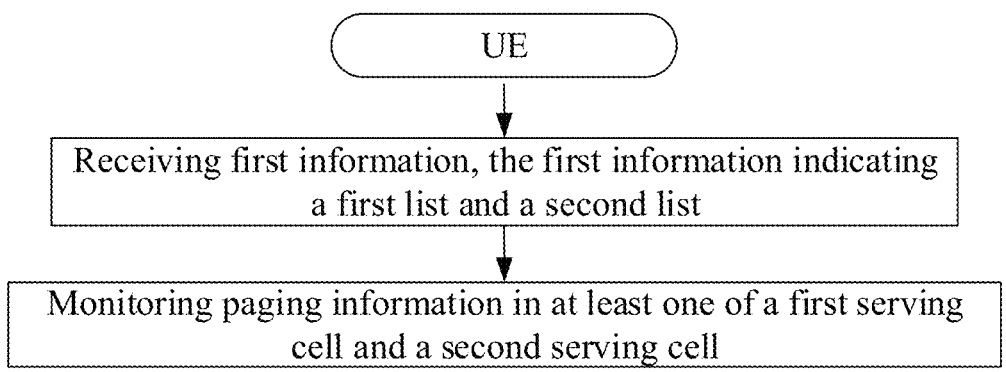
FIG. 1 is a flowchart of first information according to one embodiment of the disclosure.

Embodiment 1 illustrates an example of a flowchart of first information, as shown in FIG. 1.

In Embodiment 1, the UE in the disclosure first receives first information, the first information indicating a first list and a second list, and then monitors paging information in at least one of a first serving cell and a second serving cell; an area identifier corresponding to the first serving cell belongs to the first list, and an area identifier corresponding to the second serving cell belongs to the second list; the first list and the second list include Q1 area identifier(s) and Q2 area identifier(s) respectively, the Q1 and the Q2 are positive integers respectively; and the first list and the second list can be updated separately.

In one subembodiment, an area identifier corresponding to a given serving cell is a Tracking Area Code (TAC) of a TA to which the given serving cell belongs.

In one subembodiment, an area identifier corresponding to a given serving cell is a Tracking Area Identity (TAI) of a TA to which the given serving cell belongs.

In one subembodiment, an area identifier corresponding to a given serving cell is a Location Area Identity (LAI) to which the given serving cell belongs.

In one subembodiment, an area identifier corresponding to a given serving cell is a Location Area Code (LAC) to which the given serving cell belongs.

In one subembodiment, an area identifier corresponding to a given serving cell is a Location Area Code (LAC) to which the given serving cell belongs.

In one subembodiment, the first list is one TAC list.
In one subembodiment, the second list is one TAC list.
In one subembodiment, the first list is one TAI list.
In one subembodiment, the second list is one TAI list.
In one subembodiment, the Q1 area identifiers share one Public Land Mobile Network (PLMN) ID.

In one subembodiment, the Q2 area identifiers share one PLMN ID.

In one subembodiment, the first information includes first sub-information and second sub-information; the first sub-information and the second sub-information indicate the first list and the second list respectively.

In one affiliated embodiment of the above subembodiment, the first sub-information and the second sub-information are transmitted through the first serving cell and the second serving cell respectively.

In one affiliated embodiment of the above subembodiment, the first sub-information and the second sub-information are both transmitted through the first serving cell.

In one affiliated embodiment of the above subembodiment, the first sub-information and the second sub-information are both transmitted through the second serving cell.

In one affiliated embodiment of the above subembodiment, the first sub-information and the second sub-information are transmitted by one MME.

In one affiliated embodiment of the above subembodiment, the first sub-information and the second sub-information are transmitted by two MMEs respectively.

In one subembodiment, the phrase that the first list and the second list can be updated separately refers that: a network equipment can transmit downlink information to modify the first list only, or a network equipment can transmit downlink information to modify the second list only.

In one affiliated embodiment of the above subembodiment, the downlink information is a TRACKING AREA UPDATE ACCEPT message.

In one affiliated embodiment of the above subembodiment, the downlink information includes partial or all Information Elements (IEs) in a TRACKING AREA UPDATE ACCEPT message.

In one subembodiment, the phrase that the first list and the second list can be updated separately refers that: the UE can transmit uplink information to request update of the first list only, or the UE can transmit uplink information to request update of the second list only.

In one subembodiment, the uplink information is a TRACKING AREA UPDATE REQUEST message.

In one subembodiment, the uplink information includes partial or all IEs in a TRACKING AREA UPDATE REQUEST message.

In one subembodiment, the first serving cell is a cell deployed on a first-type base station, and the second serving cell is a cell deployed on a second-type base station.

In one affiliated embodiment of the above subembodiment, the first-type base station is a base station corresponding to a terrestrial network, and the second-type base station is a base station corresponding to a non-terrestrial network.

In one affiliated embodiment of the above subembodiment, the first-type base station is a base station corresponding to a non-terrestrial network, and the second-type base station is a base station corresponding to a terrestrial network.

In one subembodiment, the base station corresponding to a non-terrestrial network in the disclosure is deployed on at least one of a GEO, an MEO, an LEO, a hot-air balloon or an Airborne Platform.

In one subembodiment, the UE keeps a connection with the first serving cell and the second serving cell simultaneously.

Embodiment 2

Figure 2:
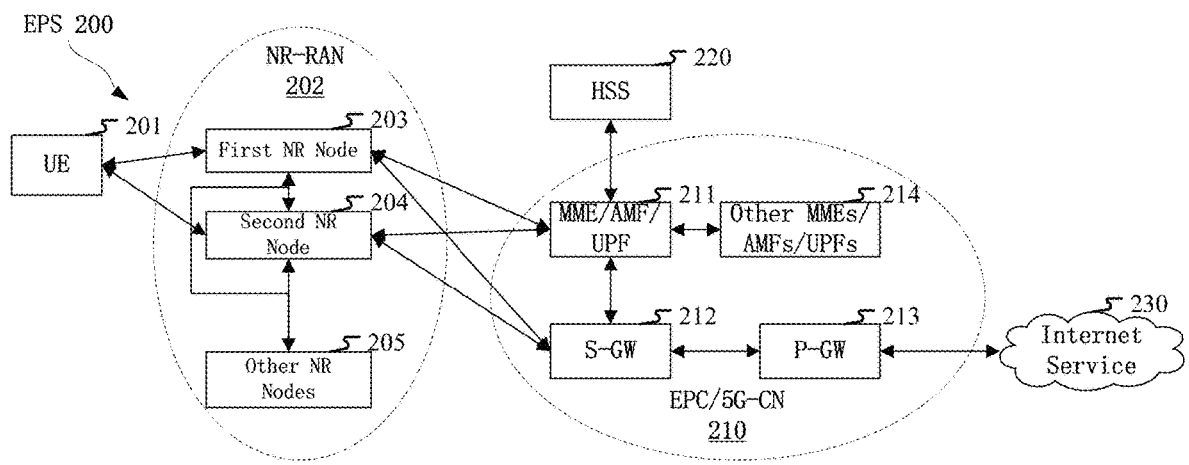
FIG. 2 is a diagram illustrating a network architecture according to one embodiment of the disclosure.

Embodiment 2 illustrates an example of a diagram of a network architecture, as shown in FIG. 2.

Embodiment 2 illustrates an example of a diagram of a network architecture according to the disclosure, as shown in FIG. 2. FIG. 2 is a diagram illustrating a network architecture 200 of NR 5G Long-Term Evolution (LTE) and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes a first NR node (gNB) 203, a second NR node 204, other gNBs 205. At least one of the gNB 203 or gNB 204 provides UE 201 oriented user plane and control plane protocol terminations. The gNB 203 may be connected to the gNB 204 via an Xn interface, the gNB 203 and the gNB 204 may be connected to other gNBs 205 via Xn interfaces (for example, backhaul). The gNB 203, the gNB 204 and the gNB 205 may be called a base station, a base transceiver station, a radio base station, a radio transceiver, a transceiver function, a Basic Service Set (BSS), an Extended Service Set (ESS), a TRP or some other appropriate terms. At least one of the gNB 203 or the gNB 204 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-territorial network base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, or some other appropriate terms. At least one of the gNB 203 or the gNB 204 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one subembodiment, the UE 201 corresponds to the UE in the disclosure.

In one subembodiment, the eNB 203 corresponds to the first base station in the disclosure.

In one subembodiment, the eNB 204 corresponds to the second base station in the disclosure.

In one subembodiment, the eNB 205 includes the third base station in the disclosure.

In one subembodiment, the UE 201 supports non-territorial network radio communications.

In one subembodiment, the UE 201 directly accesses an NR 5G network through a satellite.

In one subembodiment, the first information in the disclosure is generated by an MME, and is transmitted to the UE 201 through the gNB 203.

In one affiliated embodiment of the above subembodiment, the first information is transparent for the gNB 203.

In one subembodiment, the first information in the disclosure is generated by an MME, and is transmitted to the UE 201 through the gNB 204.

In one affiliated embodiment of the above subembodiment, the first information is transparent for the gNB 204.

In one subembodiment, the second information in the disclosure is generated by an MME, and is transmitted to the UE 201 through the gNB 205.

In one affiliated embodiment of the above subembodiment, the second information is transparent for the gNB 205.

In one subembodiment, the fifth information in the disclosure is generated by an MME, and is transmitted to the UE 201 through the gNB 205.

In one affiliated embodiment of the above subembodiment, the fifth information is transparent for the gNB 205.

Embodiment 3

Figure 3:
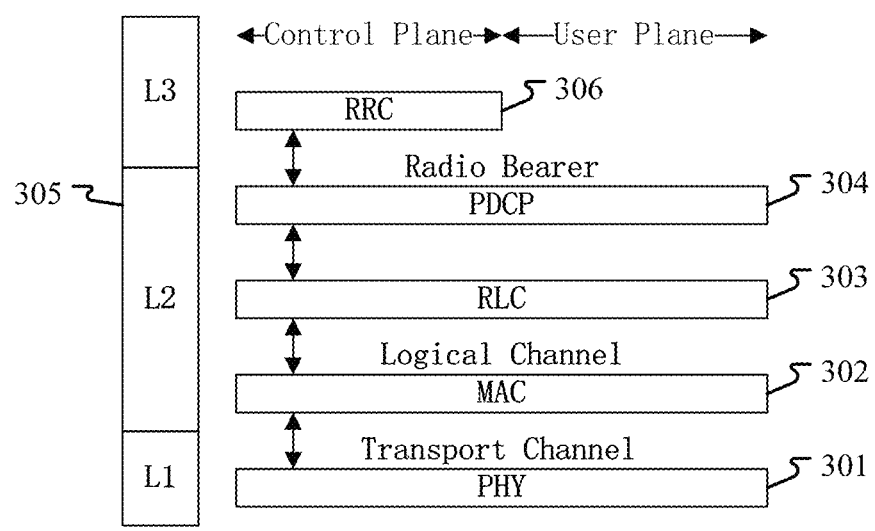
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is represented by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one subembodiment, the radio protocol architecture shown in FIG. 3 is applicable to the UE in the disclosure.

In one subembodiment, the radio protocol architecture shown in FIG. 3 is applicable to at least one of the first base station, the second base station or the third base station in the disclosure.

In one subembodiment, the first information in the disclosure is generated on the RRC sublayer 306.

In one subembodiment, the second information in the disclosure is generated on the RRC sublayer 306.

In one subembodiment, the third information in the disclosure is generated on the RRC sublayer 306.

In one subembodiment, the fourth information in the disclosure is generated on the RRC sublayer 306.

In one subembodiment, at least one of the third information or the fourth information in the disclosure is Non-access Stratum (NAS) information.

In one subembodiment, the fifth information in the disclosure is generated on the RRC sublayer 306.

Embodiment 4

Figure 4:
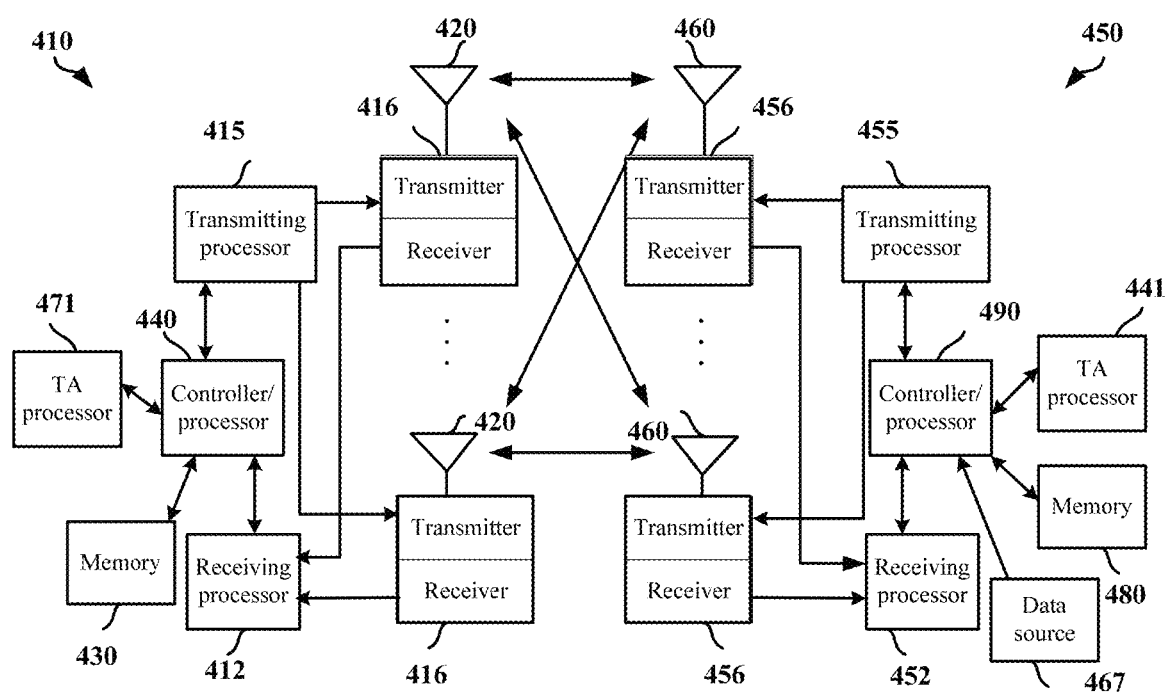
FIG. 4 is a diagram illustrating an eNB and a UE according to one embodiment of the disclosure.

Embodiment 4 illustrates a diagram of a given base station and a UE according to the disclosure, as shown in FIG. 4. The given base station is one of the first base station, the second base station or the third base station in the disclosure. FIG. 4 is a block diagram of a gNB 410 in communication with a UE 450 in an access network.

The base station 410 includes a controller/processor 440, a memory 430, a receiving processor 412, a transmitting processor 415, a TA processor 471, a transmitter/receiver 416 and an antenna 420.

The UE 450 includes a controller/processor 490, a memory 480, a data source 467, a transmitting processor 455, a receiving processor 452, a TA processor 441, a transmitter/receiver 456 and an antenna 460.

In Downlink (DL) transmission, processes relevant to the base station device 410 include the following.

A higher-layer packet is provided to the controller/processor 440. The controller/processor 440 provides header compression, encryption, packet segmentation and reordering, multiplexing and de-multiplexing between a logical channel and a transport channel, to implement L2 protocols used for the user plane and the control plane. The higher-layer packet may include data or control information, for example, Downlink Shared Channel (DL-SCH).

The controller/processor 440 is connected to the memory 430 that stores program codes and data. The memory 430 may be a computer readable medium.

The controller/processor 440 includes a scheduling unit for transmission requirements, and the scheduling unit is configured to schedule air interface resources corresponding to transmission requirements.

The TA processor 471 determines first information, or determines second information and fifth information, and transmits results to the controller/processor 440.

The transmitting processor 415 receives a bit stream output from the controller/processor 440, and performs various signal transmitting processing functions of L1 layer (that is, PHY), including encoding, interleaving, scrambling, modulation, power control/allocation, generation of physical layer control signalings (including PBCH, PDCCH, PHICH, PCFICH, reference signal), etc.

The transmitter 416 is configured to convert the baseband signal provided by the MIMO transmitting processor 441 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In Downlink (DL) transmission, processes relevant to the UE 450 include the following.

The receiver 456 is configured to convert a radio-frequency signal received via the antenna 460 into a baseband signal and provide the baseband signal to receiving processor 452.

The receiving processor 452 performs various signal receiving processing functions of an L1 layer (that is, PHY), including decoding, de-interleaving, descrambling, demodulation, extraction of physical layer control signaling, etc.

The TA processor 441 determines first information, or determines second information and fifth information, and transmits results to the controller/processor 490.

The controller/processor 490 receives a bit stream output from the receiving processor 452, and provides header decompression, decryption, packet segmentation and reordering, multiplexing and de-multiplexing between a logical channel and a transport channel, to implement L2 protocols used for the user plane and the control plane.

The controller/processor 490 is connected to the memory 480 that stores program codes and data. The memory 480 may be a computer readable medium.

In UL transmission, processes relevant to the base station device 410 include the following.

The receiver 416 receives a radio-frequency signal received via the corresponding antenna 420, converts the received radio-frequency signal into a baseband signal and provides the baseband signal to the receiving processor 412.

The receiving processor 412 performs various signal receiving processing functions of an L1 layer (that is, PHY), including decoding, de-interleaving, descrambling, demodulation, extraction of physical layer control signaling, etc.

The controller/processor 440 performs functions of L2 layer, and is connected to the memory 430 that stores program code and data.

The controller/processor 440 provides de-multiplexing between a logical channel and a transport channel, packet reassembling, decryption, header decompression and control signaling processing to recover a higher-layer packet from the UE 450. The higher-layer packet from the UE 450 may be provided to the core network.

The TA processor 471 determines first information, or determines second information and fifth information, and transmits results to the controller/processor 440.

In Uplink (UL) transmission, processes relevant to the UE 450 include the following.

The data source 467 provides a higher-layer packet to the controller/processor 490. The data source 467 represents all protocol layers above L2 layer.

The transmitter 456 transmits a radio-frequency signal via the corresponding antenna 460, converts a baseband signal into a radio-frequency signal and provides the radio-frequency radio to the corresponding antenna 460.

The transmitting processor 444 performs various signal receiving processing functions of an L1 layer (that is, PHY), including decoding, deinterleaving, descrambling, demodulation and extraction of physical layer control signalings, etc.

The controller/processor 490 provides header compression, encryption, packet segmentation and reordering, multiplexing between a logical channel and a transport channel based on radio resource allocation of the gNB 410, to implement the L2 functions used for the user plane and the control plane.

The controller/processor 459 is also in charge of HARQ operation, retransmission of lost packets, and signalings to the gNB 410.

The TA processor 441 determines first information, or determines second information and fifth information, and transmits results to the controller/processor 490.

In one subembodiment, the UE 450 includes at least one processor and at least one memory. The at least one memory includes computer program codes. The at least one memory and the computer program codes are configured to be used in collaboration with the at least one processor. The UE 450 at least receives first information, the first information indicating a first list and a second list, and monitors paging information in at least one of a first serving cell and a second serving cell; an area identifier corresponding to the first serving cell belongs to the first list, and an area identifier corresponding to the second serving cell belongs to the second list; the first list and the second list include Q1 area identifier(s) and Q2 area identifier(s) respectively, the Q1 and the Q2 are positive integers respectively; and the first list and the second list can be updated separately.

In one subembodiment, the UE 450 includes a memory that stores a computer readable instruction program. The computer readable instruction program generates an action when executed by at least one processor. The action includes: receiving first information, the first information indicating a first list and a second list, and monitoring paging information in at least one of a first serving cell and a second serving cell; an area identifier corresponding to the first serving cell belongs to the first list, and an area identifier corresponding to the second serving cell belongs to the second list; the first list and the second list include Q1 area identifier(s) and Q2 area identifier(s) respectively, the Q1 and the Q2 are positive integers respectively; and the first list and the second list can be updated separately.

In one subembodiment, the gNB 410 device includes at least one processor and at least one memory. The at least one memory includes computer program codes. The at least one memory and the computer program codes are configured to be used in collaboration with the at least one processor. The gNB 410 at least transmits first information, the first information indicating a first list and a second list, and transmits paging information in a first serving cell; an area identifier corresponding to the first serving cell belongs to the first list, and an area identifier corresponding to a second serving cell belongs to the second list; the first list and the second list include Q1 area identifier(s) and Q2 area identifier(s) respectively, the Q1 and the Q2 are positive integers respectively; the first list and the second list can be updated separately; a receiver of the first information includes a first terminal; and the first base station is a maintenance base station for the first serving cell.

In one embodiment, the gNB 410 includes a memory that stores a computer readable instruction program. The computer readable instruction program generates an action when executed by at least one processor. The action includes transmitting first information, the first information indicating a first list and a second list, and transmitting paging information in a first serving cell; an area identifier corresponding to the first serving cell belongs to the first list, and an area identifier corresponding to a second serving cell belongs to the second list; the first list and the second list include Q1 area identifier(s) and Q2 area identifier(s) respectively, the Q1 and the Q2 are positive integers respectively; the first list and the second list can be updated separately; a receiver of the first information includes a first terminal; and the first base station is a maintenance base station for the first serving cell.

In one subembodiment, the gNB 410 device includes at least one processor and at least one memory. The at least one memory includes computer program codes. The at least one memory and the computer program codes are configured to be used in collaboration with the at least one processor. The gNB 410 at least transmits paging information in a second serving cell; first information indicates a first list and a second list, an area identifier corresponding to a first serving cell belongs to the first list, and an area identifier corresponding to the second serving cell belongs to the second list; the first list and the second list include Q1 area identifier(s) and Q2 area identifier(s) respectively, the Q1 and the Q2 are positive integers respectively; the first list and the second list can be updated separately; a receiver of the first information includes a first terminal; a first base station is a maintenance base station for the first serving cell; and the first base station transmits the first information.

In one embodiment, the gNB 410 includes a memory that stores a computer readable instruction program. The computer readable instruction program generates an action when executed by at least one processor. The action includes transmitting paging information in a second serving cell; first information indicates a first list and a second list, an area identifier corresponding to a first serving cell belongs to the first list, and an area identifier corresponding to the second serving cell belongs to the second list; the first list and the second list include Q1 area identifier(s) and Q2 area identifier(s) respectively, the Q1 and the Q2 are positive integers respectively; the first list and the second list can be updated separately; a receiver of the first information includes a first terminal; a first base station is a maintenance base station for the first serving cell; and the first base station transmits the first information.

In one subembodiment, the gNB 410 device includes at least one processor and at least one memory. The at least one memory includes computer program codes. The at least one memory and the computer program codes are configured to be used in collaboration with the at least one processor. The gNB 410 at least transmits second information, the second information indicating a first area identifier; a receiver of the second information includes a first terminal, the first terminal judges at least one of whether the first area identifier belongs to the first list or whether the first area identifier belongs to the second list; when the first area identifier is outside the first list, the receiving of the second information triggers the first terminal to transmit third information; when the first area identifier is outside the second list, the receiving of the first information triggers the first terminal to transmit fourth information; the first list and the second list include Q1 area identifier(s) and Q2 area identifier(s) respectively, the Q1 and the Q2 are positive integers respectively; and the first list and the second list can be updated separately.

In one embodiment, the gNB 410 includes a memory that stores a computer readable instruction program. The computer readable instruction program generates an action when executed by at least one processor. The action includes transmitting second information, the second information indicating a first area identifier; a receiver of the second information includes a first terminal, the first terminal judges at least one of whether the first area identifier belongs to the first list or whether the first area identifier belongs to the second list; when the first area identifier is outside the first list, the receiving of the second information triggers the first terminal to transmit third information; when the first area identifier is outside the second list, the receiving of the first information triggers the first terminal to transmit fourth information; the first list and the second list include Q1 area identifier(s) and Q2 area identifier(s) respectively, the Q1 and the Q2 are positive integers respectively; and the first list and the second list can be updated separately.

In one subembodiment, the UE 450 corresponds to the UE in the disclosure.

In one subembodiment, the gNB 410 corresponds to the first base station in the disclosure.

In one subembodiment, the gNB 410 corresponds to the second base station in the disclosure.

In one subembodiment, the gNB 410 corresponds to the third base station in the disclosure.

In one subembodiment, at least the former two of the receiver 456, the receiving processor 452 and the controller/processor 490 are used for receiving at least one of the first information, the second information or the fifth information in the disclosure.

In one subembodiment, at least the former two of the receiver 456, the receiving processor 452 and the controller/ processor 490 are used for monitoring paging information in at least one of a first serving cell and a second serving cell.

In one subembodiment, at least the former two of the transmitter 456, the transmitting processor 455 and the controller/processor 490 are used for transmitting at least one of third information or fourth information.

In one subembodiment, at least one of the TA processor 441 and the controller/processor 490 is used for determining a first time-frequency resource set and a second time-frequency resource set.

In one subembodiment, the TA processor 441 is used for determining at least one of first information, second information or fifth information.

In one subembodiment, the TA processor 441 is used for judging at least one of whether the first area identifier belongs to the first list or whether the first area identifier belongs to the second list.

In one subembodiment, at least the former two of the transmitter 416, the transmitting processor 415 and the controller/processor 440 are used for transmitting at least one of the first information, the second information or the fifth information in the disclosure.

In one subembodiment, at least the former two of the transmitter 416, the transmitting processor 415 and the controller/processor 440 are used for transmitting paging information in at least one of a first serving cell and a second serving cell.

In one subembodiment, at least the former two of the receiver 416, the receiving processor 412 and the controller/processor 440 are used for receiving at least one of third information or fourth information.

In one subembodiment, at least one of the TA processor 471 and the controller/processor 490 is used for configuring a first time-frequency resource set.

In one subembodiment, at least one of the TA processor 471 and the controller/processor 490 is used for configuring a second time-frequency resource set.

In one subembodiment, the TA processor 471 is used for determining at least one of first information, second information or fifth information.

Embodiment 5

Figure 5:
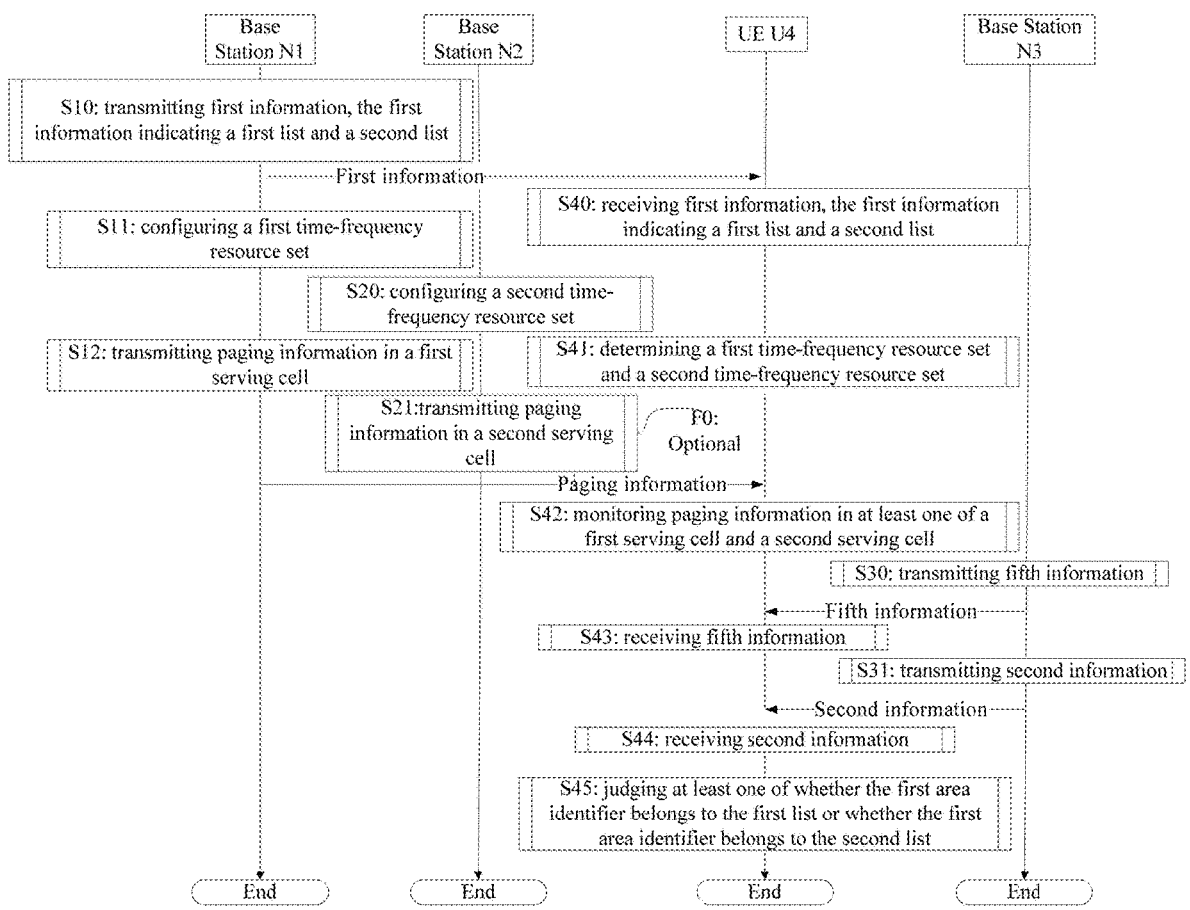
FIG. 5 is a flowchart of second information according to one embodiment of the disclosure.

Embodiment 5 illustrates an example of a flowchart of second information, as shown in FIG. 5. In FIG. 5, a base station N1 and a base station N2 are maintenance base stations for serving cells of a UE U4, a base station N3 is a maintenance base station for a target cell to which the UE U4 moves, and steps in box F0 are optional. The base station N1 corresponds to the first network equipment in the disclosure, the base station N2 corresponds to the second base station in the disclosure, and the base station N3 corresponds to the third base station in the disclosure.

The base station N1 transmits first information in S10, the first information indicating a first list and a second list, configures a first time-frequency resource set in S11, and transmits paging information in a first serving cell in S12.

The base station N2 configures a second time-frequency resource set in 20 and transmits paging information in a second serving cell in S21.

The base station N3 transmits fifth information in S30, and transmits second information in S31, the second information indicating a first area identifier.

The UE U4 receives first information in S40, the first information indicating a first list and a second list, determines a first time-frequency resource set and a second time-frequency resource set in S41, monitors paging information in at least one of a first serving cell and a second serving cell in S42, receives fifth information in S43, receives second information in S44, the second information indicating a first area identifier, and judges at least one of whether the first area identifier belongs to the first list or whether the first area identifier belongs to the second list in S45.

In Embodiment 5, an area identifier corresponding to the first serving cell belongs to the first list, and an area identifier corresponding to the second serving cell belongs to the second list; the first list and the second list include Q1 area identifier(s) and Q2 area identifier(s) respectively, the Q1 and the Q2 are positive integers respectively; the first list and the second list can be updated separately; when the first area identifier is outside the first list, the receiving of the second information triggers a transmitting of third information; when the first area identifier is outside the second list, the receiving of the first information triggers a transmitting of fourth information; the UE U4 judges only one of whether the first area identifier belongs to the first list or whether the first area identifier belongs to the second list; and the fifth information is used for determining a judgment on whether the first area identifier belongs to the first list or a judgment on whether the first area identifier belongs to the second list; the UE U4 monitors paging information in the first time-frequency resource set of the first serving cell and the second time-frequency resource set of the second serving cell respectively, location information of the UE is used for determining the first time-frequency resource set, and the second time-frequency resource set is unrelated to the location information of the UE.

In one subembodiment, when the first area identifier belongs to the first list, the receiving of the second information does not trigger the transmitting of the third information.

In one subembodiment, when the first area identifier belongs to the second list, the receiving of the second information does not trigger the transmitting of the fourth information.

In one subembodiment, the third information includes TRACKING AREA UPDATE REQUEST information.

In one subembodiment, the fourth information includes TRACKING AREA UPDATE REQUEST information.

In one affiliated embodiment of the above two subembodiments, the TRACKING AREA UPDATE REQUEST information is used for determining the first area identifier.

In one subembodiment, the third information includes MEASUREMENT REPORT information.

In one subembodiment, the fourth information includes MEASUREMENT REPORT information.

In one affiliated embodiment of the above two subembodiments, the MEASUREMENT REPORT information is used for determining the first area identifier.

In one subembodiment, the third information includes an RACH.

In one subembodiment, the first area identifier is an area identifier corresponding to a cell other than the first serving cell and the second serving cell.

In one subembodiment, the receiving of the third information terminates on an MME of the UE.

In one subembodiment, the receiving of the fourth information terminates on an MME of the UE.

In one subembodiment, the first area identifier is related to the base station N3.

In one affiliated embodiment of the above subembodiment, the first area identifier is a TAC corresponding to the base station N3, or the first area identifier is a TAI corresponding to the base station N3.

In one subembodiment, the fifth information indicates a type corresponding to the first area identifier.

In one affiliated embodiment of the above subembodiment, the identifier includes at least one of a PCI or a CGI.

In one subembodiment, the fifth information indicates a type of the base station N3.

In one affiliated embodiment of the above subembodiment, the type of the base station N3 is one type in a candidate type set, and the candidate type set includes an NTN serving cell or a TN serving cell.

In one subembodiment, the location information of the UE U4 is related to the first list.

In one subembodiment, the location information of the UE U4 is related to at least one of the longitude of the UE U4 and the latitude of the UE U4.

In one subembodiment, the first time-frequency resource set and the second time-frequency resource set are orthogonal in frequency domain.

In one subembodiment, the first time-frequency resource set and the second time-frequency resource set are orthogonal in time domain.

In one subembodiment, the first time-frequency resource set and the second time-frequency resource set are orthogonal in code domain.

In one subembodiment, the UE detects first-type paging information in the first time-frequency resource set, and the first-type paging information includes at least one of Earthquake and Tsunami Warning System (EWTS) notifications or Commercial Mobile Alert System (CMSA) notifications.

In one affiliated embodiment of the above subembodiment, the first-type paging information is transmitted in time-frequency resources other than the second time-frequency resource set.

In one subembodiment, positions of time-frequency resources occupied by the first time-frequency resource set are related to the first list.

In one subembodiment, positions of time-frequency resources occupied by the first time-frequency resource set are related to the area identifier to which the first serving cell belongs.

In one affiliated embodiment of the above two subembodiments, the positions of time-frequency resources refer to positions of time-domain resources, or the positions of time-frequency resources refer to positions of frequency-domain resources.

In one subembodiment, the area identifier corresponding to the first serving cell is equal to the area identifier corresponding to the second serving cell.

In one affiliated embodiment of the above subembodiment, the area identifier is a TAI.

In one affiliated embodiment of the above subembodiment, the area identifier is a TAC.

In one affiliated embodiment of the above subembodiment, the area identifier is a PLMN.

In one subembodiment, the third information is used for adding the first area identifier to the first list.

In one subembodiment, the fourth information is used for adding the first area identifier to the first list.

In one subembodiment, area identifiers included in the first list are used for first-type base stations only, and area identifiers included in the second list are used for second-type base stations only.

In one affiliated embodiment of the above subembodiment, the first-type base station and the second-type base station have different deployment modes.

In one affiliated embodiment of the above subembodiment, the first-type base station is a territorial network base station and the second-type base station is an NTN base station.

In one subembodiment, the area identifier belongs to one of a first-type area identifier or a second-type area identifier.

In one affiliated embodiment of the above subembodiment, the first-type area identifier is an area identifier corresponding to a territorial network base station.

In one affiliated embodiment of the above subembodiment, the second-type area identifier is an area identifier corresponding to a non-territorial network base station.

Embodiment 6

Figure 6:
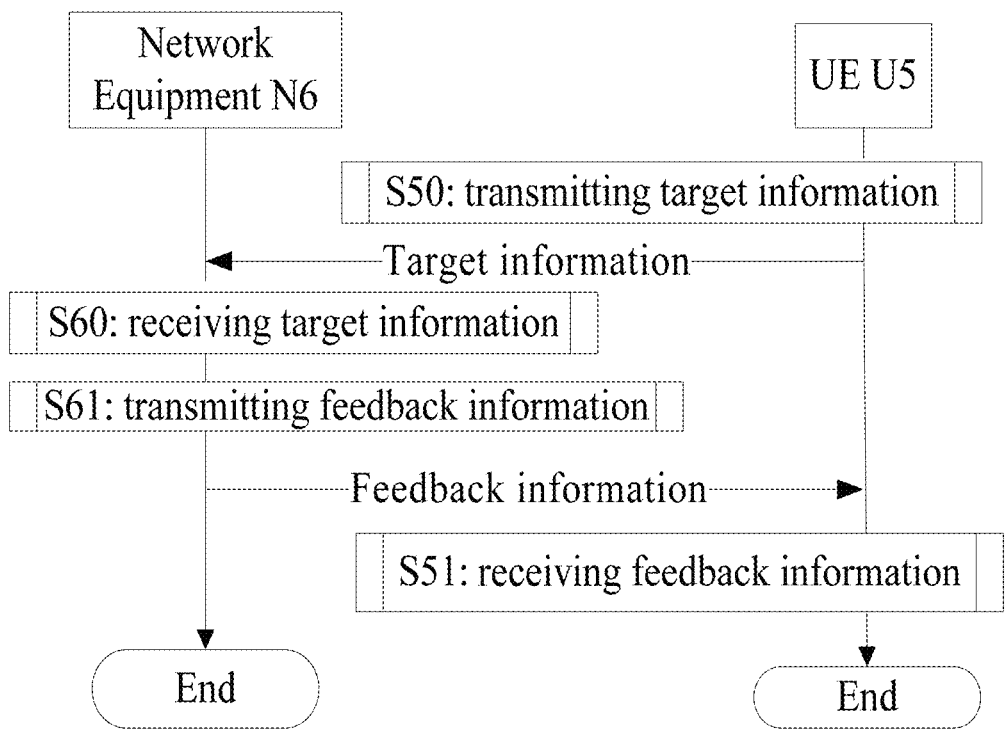
FIG. 6 is a flowchart of target information according to one embodiment of the disclosure.

Embodiment 6 illustrates a flowchart of target information, as shown in FIG. 6. In FIG. 6, a target network equipment N6 performs communication with a UE U5.

The target network equipment N6 receives target information in S60, and transmits feedback information in S61.

The UE U5 transmits target information in S50, and receives feedback information in S51.

In Embodiment 6, the target information is the third information in the disclosure, or the target information is the fourth information in the disclosure; the receiving of the target information is used for triggering the transmitting of the feedback information.

In one subembodiment, the target information is used by the UE U5 to request update of an MME state of the UE.

In one subembodiment, the target information is used by the target network equipment N6 to acknowledge an accept of update of an MME state of the UE U5 to the UE U5.

In one subembodiment, the target information includes TRACKING AREA UPDATE REQUEST information.

In one subembodiment, the feedback information includes TRACKING AREA UPDATE ACCEPT information.

In one subembodiment, the feedback information includes TRACKING AREA UPDATE COMPLETE information.

In one subembodiment, the target network equipment N6 is the first base station in the disclosure.

In one subembodiment, the target network equipment N6 is the third base station in the disclosure.

In one subembodiment, the target network equipment N6 is an MME of the UE U5.

In one subembodiment, the third information is used for updating the first list in the disclosure, and the fourth information is used for updating the second list in the disclosure.

Embodiment 7

Figure 7:
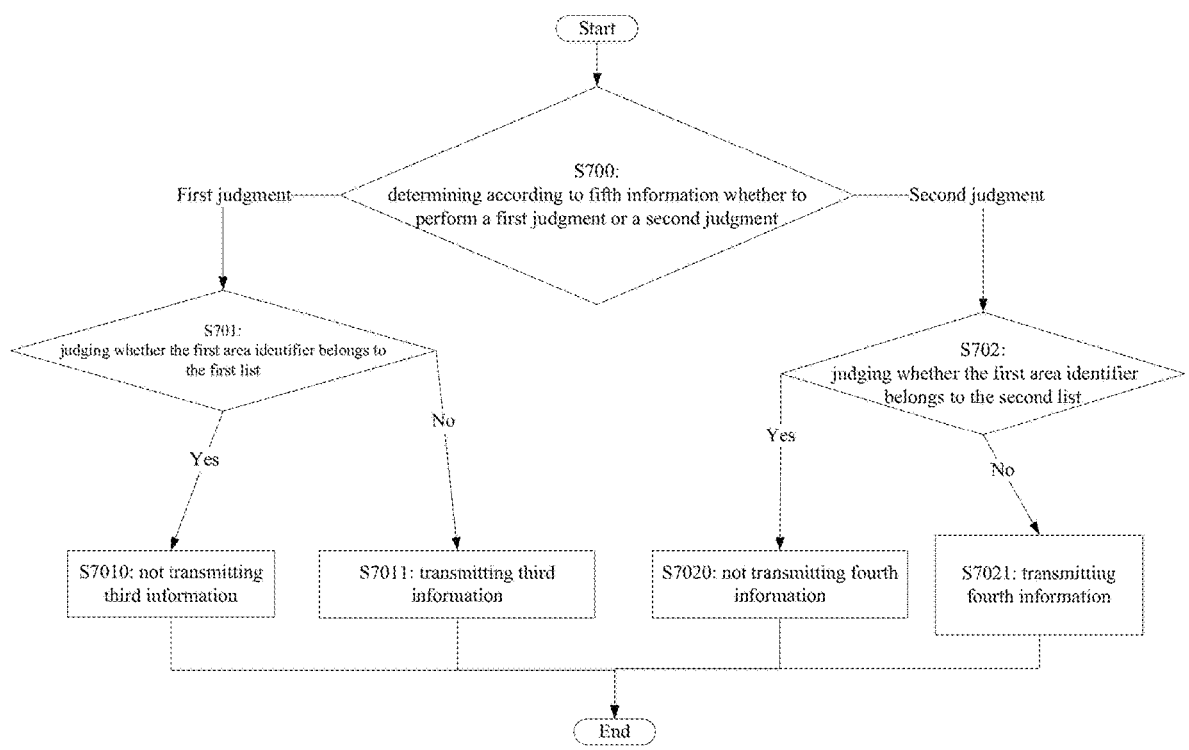
FIG. 7 is a flowchart of judgment according to fifth information according to one embodiment of the disclosure.

Embodiment 7 illustrates a flowchart of judgment according to fifth information, as shown in FIG. 7. In FIG. 7, a UE determines according to the fifth information whether to perform a first judgment or a second judgment in S700, the first judgment refers to judging whether the first area identifier belongs to the first list, and the second judgment refers to judging whether the first area identifier belongs to the second list; when determining to perform the first judgment, the UE judges whether the first area identifier belongs to the first list in S701; the first area identifier belongs to the first list, the UE does not transmit third information in S7010; the first area identifier does not belong to the first list, the UE transmits third information in S7011; when determining to perform the second judgment, the UE judges whether the first area identifier belongs to the second list in S702; the first area identifier belongs to the second list, the UE does not transmit fourth information in S7020; the first area identifier does not belong to the second list, the UE transmits fourth information in S7021.

In one subembodiment, the fifth information is used for determining a type of the third base station in the disclosure, and the type of the third base station is used by the UE to determine whether to perform S701 or S702 after S700.

In one affiliated embodiment of the above subembodiment, the fifth information indicates that the third base station is a first-type bases station, and the UE determines to perform S701 after S700.

In one affiliated embodiment of the above subembodiment, the fifth information indicates that the third base station is a second-type bases station, and the UE determines to perform S702 after S700.

In one subembodiment, the first-type base station in the disclosure is a territorial network base station.

In one subembodiment, the second-type base station in the disclosure is a non-territorial network base station.

Embodiment 8

Figure 8:
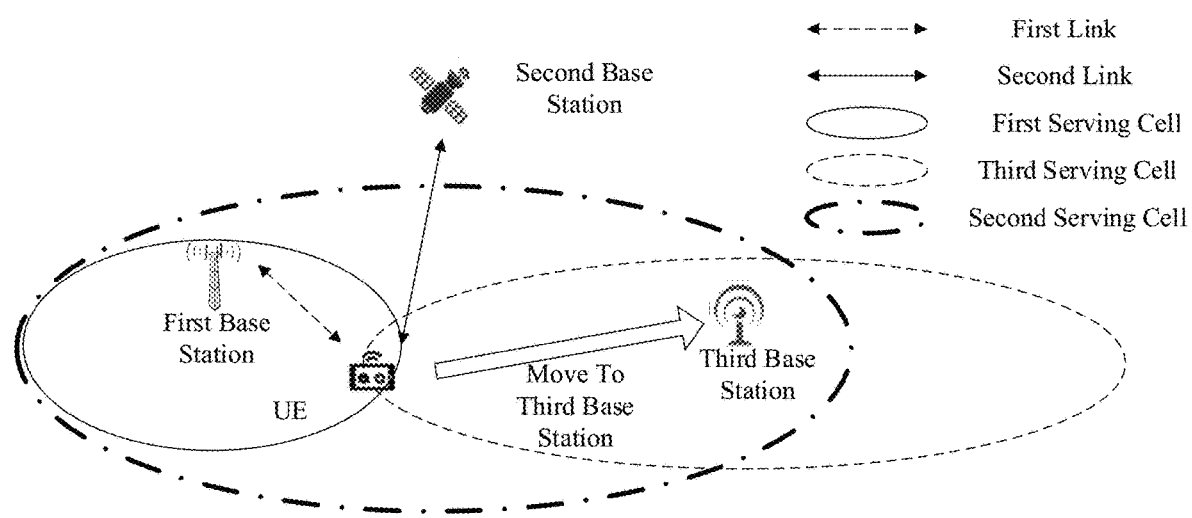
FIG. 8 is a diagram illustrating a distribution of a UE, a first base station, a second base station and a third base station according to the disclosure.

Embodiment 8 illustrates an example of a diagram of a distribution of a UE, a first base station, a second base station and a third base station, as shown in FIG. 8. In FIG. 8, the UE is a ground terminal; the first base station and the second base station are a territorial network base station and a non-territorial network base station respectively; the UE keeps a connection with a first serving cell and a second serving cell before entering the coverage of the third base station, the first base station is a maintenance base station for the first serving cell, and the second base station is a maintenance base station for the second serving cell; a radio link between the first base station and the UE corresponds to a first link, and a radio link between the second base station and the UE corresponds to a second link; and the first base station corresponds to the first network equipment in the disclosure.

In one subembodiment, before the UE moves to the area of the third base station and accesses the third base station, the UE maintains a connection with the first service cell and the second service cell simultaneously.

In one subembodiment, the UE moves to the coverage of the third base station, a third serving cell provides services for the UE, and the third base station is a maintenance base station for the third serving cell.

In one affiliated embodiment of the above subembodiment, the third base station corresponds to a first area identifier, the UE judges that the first area identifier belongs to the first list in the disclosure, and the UE is served by the third serving cell and the second serving cell simultaneously under the coverage of the third base station.

In one example of the above affiliated embodiment, the fifth information in the disclosure is used by the UE to determine a judgement on whether the first area identifier belongs to the first list.

In one affiliated embodiment of the above subembodiment, the third base station corresponds to a first area identifier, the UE judges that the first area identifier belongs to the second list in the disclosure, and the UE is served by the first serving cell and the third serving cell simultaneously under the coverage of the third base station.

In one example of the above affiliated embodiment, the fifth information in the disclosure is used by the UE to determine a judgement on whether the first area identifier belongs to the second list.

Embodiment 9

Figure 9:
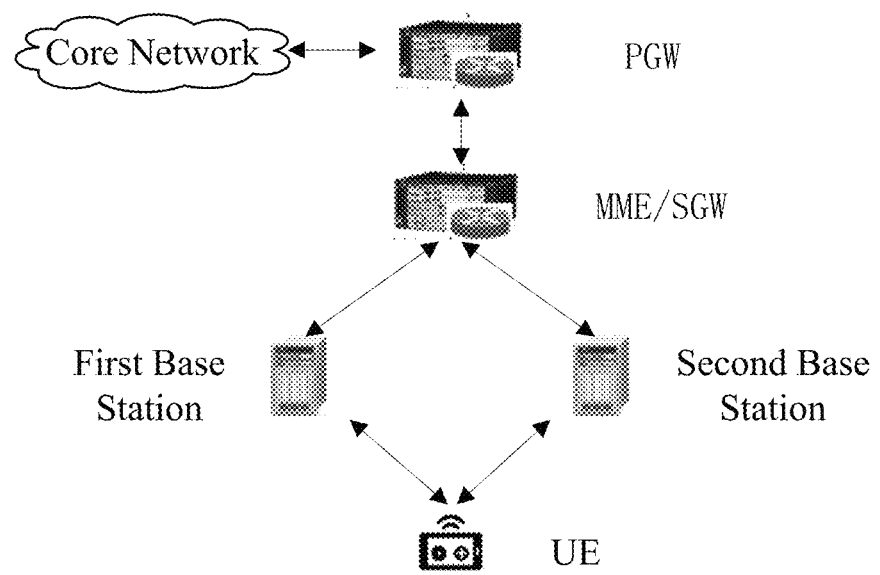
FIG. 9 is a diagram illustrating an architecture of a UE, a first base station, a first base station and a core network according to the disclosure.

Embodiment 9 illustrates an example of a diagram of an architecture of a UE, a first base station, a second base station and a core network, as shown in FIG. 9. In FIG. 9, the UE keeps a connection with the first base station and the second base station simultaneously; the first base station and the second base station are connected with one MME/SGW simultaneously, and the MME/SGW is connected with a core network through a PGW; and the first base station corresponds to the first network equipment in the disclosure.

In one subembodiment, the MME/SGW shown in FIG. 9 maintains the first list and the second list in the disclosure for the UE; the first list and the second list are used together for maintaining the mobility management of the UE.

In one subembodiment, the first time-frequency resource set in the disclosure is only used for transmitting paging information for a terminal under a base station included in the first list.

In one subembodiment, the second time-frequency resource set in the disclosure is only used for transmitting paging information for a terminal under a base station included in the second list.

In one subembodiment, the first information in the disclosure is generated by the MME/SGW, and is transmitted to the UE through the first base station.

In one affiliated embodiment of the above subembodiment, the first information is transparent for the first base station.

Embodiment 10

Figure 10:
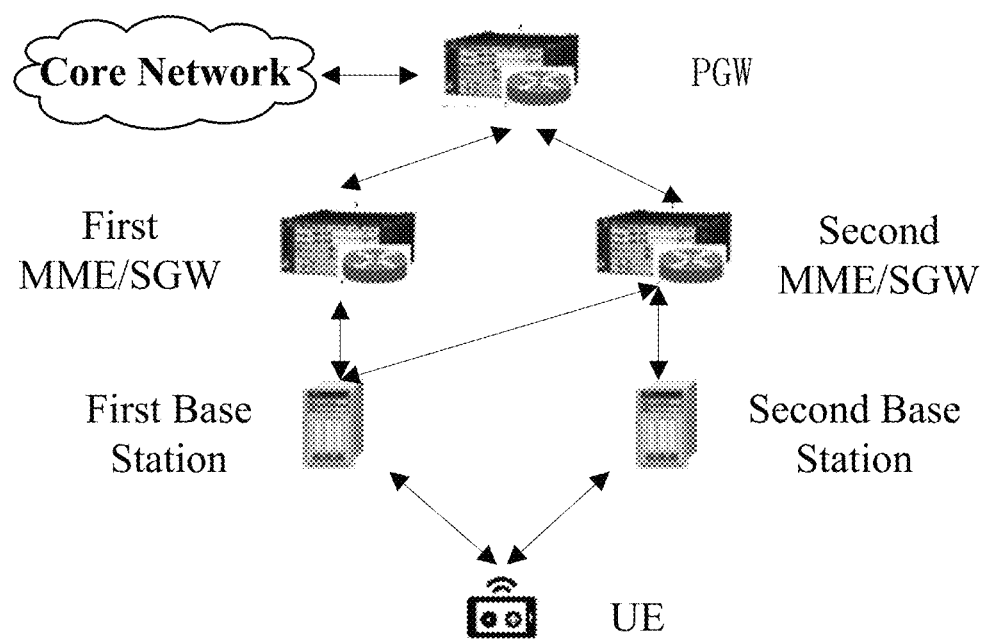
FIG. 10 is another diagram illustrating an architecture of a UE, a first base station, a first base station and a core network according to the disclosure.

Embodiment 10 illustrates an example of a diagram of an architecture of a UE, a first base station, a second base station and a core network, as shown in FIG. 10. In FIG. 10, the UE keeps a connection with the first base station and the second base station simultaneously; the first base station and the second base station are connected with a first MME/SGW and a second MME/SGW respectively, and both the first MME/SGW and the second MME/SGW are connected with a core network through one PGW; and the first base station corresponds to the first network equipment in the disclosure.

In one subembodiment, the first MME/SGW shown in FIG. 10 maintains the first list in the disclosure for the UE, the second MME/SGW shown in FIG. 10 maintains the second list in the disclosure for the UE, the first list and the second list are used together for maintaining the mobility management of the UE.

In one subembodiment, the first time-frequency resource set in the disclosure is only used for transmitting paging information for a terminal under a base station included in the first list.

In one subembodiment, the second time-frequency resource set in the disclosure is only used for transmitting paging information for a terminal under a base station included in the second list.

In one subembodiment, the first MME/SGW and the second MME/SGW are used together for generating the first information in the disclosure, and the first information is transmitted to the UE through the first base station.

In one affiliated embodiment of the above subembodiment, the first information is transparent for the first base station.

Embodiment 11

Figure 11:
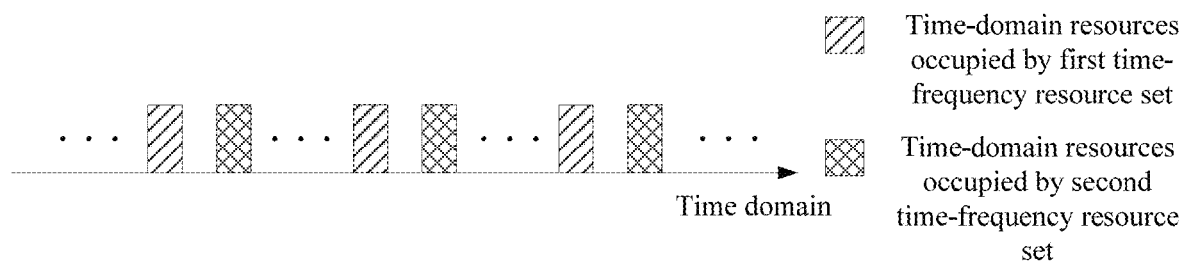
FIG. 11 is a diagram illustrating a first time-frequency resource set and a second time-frequency resource set according to the disclosure.

Embodiment 11 illustrates an example of a diagram of a first time-frequency resource set and a second time-frequency resource set, as shown in FIG. 11. In FIG. 11, time-domain resources occupied by the first time-frequency resource set are orthogonal to time-domain resources occupied by the second time-frequency resource set.

In one subembodiment, the time-domain resources occupied by the first time-frequency resource set are distributed periodically.

In one affiliated embodiment of the above subembodiment, the periodicity is related to Discontinuous Reception (DRX) configuration information of the UE.

In one subembodiment, the time-domain resources occupied by the second time-frequency resource set are distributed periodically.

In one subembodiment, the time-domain resources occupied by the first time-frequency resource set are related to one of an International Mobile Subscriber Identification Number (TMSI) or an SAE Temporary Mobile Subscriber Identity (S-IMSI) of the UE in the disclosure.

In one subembodiment, the time-domain resources occupied by the second time-frequency resource set are related to one of a TMSI or an S-IMSI of the UE in the disclosure.

Embodiment 12

Figure 12:
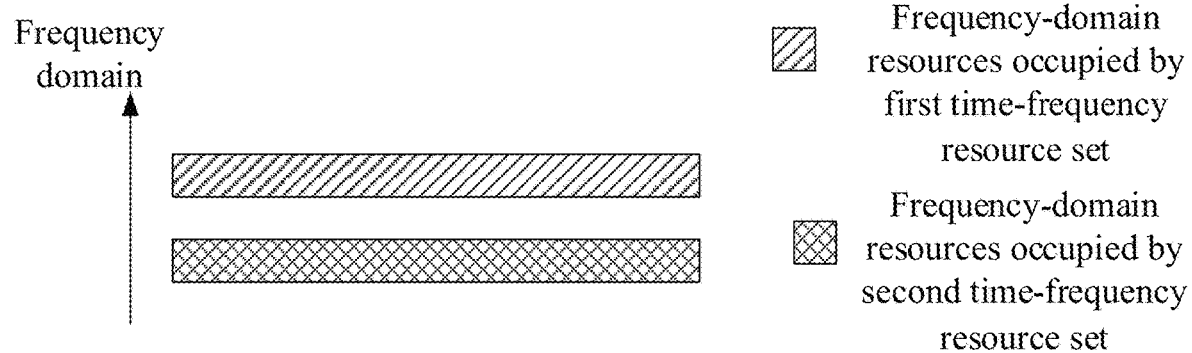
FIG. 12 is another diagram illustrating a first time-frequency resource set and a second time-frequency resource set according to the disclosure.

Embodiment 12 illustrates an example of a diagram of a first time-frequency resource set and a second time-frequency resource set, as shown in FIG. 12. In FIG. 12, frequency-domain resources occupied by the first time-frequency resource set are orthogonal to frequency-domain resources occupied by the second time-frequency resource set.

In one subembodiment, the frequency-domain resources occupied by the first time-frequency resource set are related to an area identifier corresponding to the first serving cell in the disclosure.

In one subembodiment, the frequency-domain resources occupied by the second time-frequency resource set are fixed.

In one subembodiment, the time-domain resources occupied by the first time-frequency resource set are related to one of a TMSI or an S-IMSI of the UE in the disclosure.

In one subembodiment, the time-domain resources occupied by the second time-frequency resource set are related to one of a TMSI or an S-IMSI of the UE in the disclosure.

Embodiment 13

Figure 13:
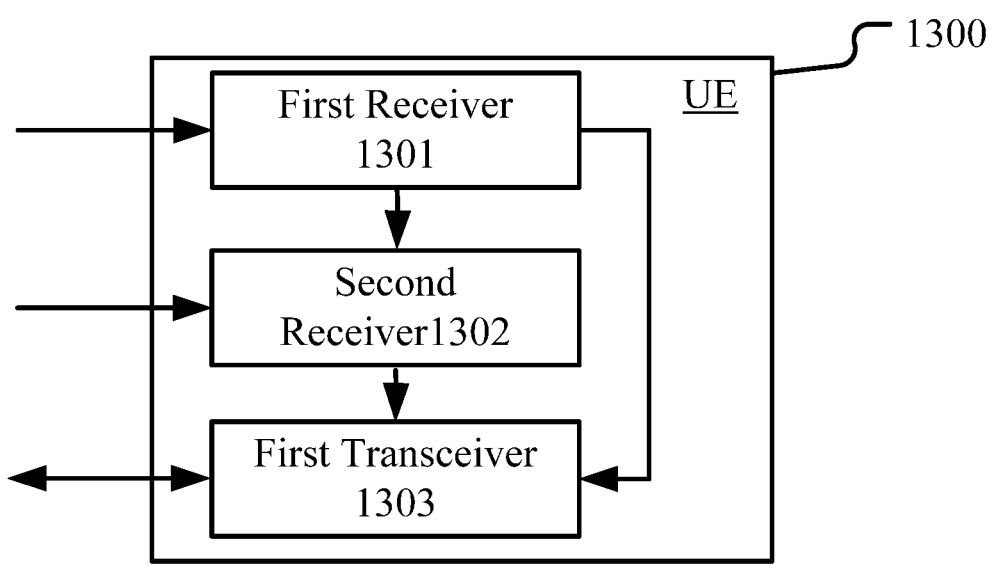
FIG. 13 is a structure block diagram illustrating a processing device in a UE according to one embodiment of the disclosure.

Embodiment 13 illustrates an example of a structure block diagram of a processing device in a UE, as shown in FIG. 13. In FIG. 13, the processing device 1300 in the UE mainly includes a first receiver 1301, a second receiver 1302 and a first transceiver 1303.

The first receiver 1301 receives first information, the first information indicating a first list and a second list.

The second receiver 1302 monitors paging information in at least one of a first serving cell and a second serving cell.

The first transceiver 1303 receives second information and judges at least one of whether the first area identifier belongs to the first list or whether the first area identifier belongs to the second list.

In Embodiment 13, an area identifier corresponding to the first serving cell belongs to the first list, and an area identifier corresponding to the second serving cell belongs to the second list; the first list and the second list include Q1 area identifier(s) and Q2 area identifier(s) respectively, the Q1 and the Q2 are positive integers respectively; the first list and the second list can be updated separately; the second information indicates a first area identifier; when the first area identifier is outside the first list, the receiving of the second information triggers a transmitting of third information; when the first area identifier is outside the second list, the receiving of the first information triggers a transmitting of fourth information.

In one subembodiment, the first transceiver 1301 receives fifth information; the UE judges only one of whether the first area identifier belongs to the first list or whether the first area identifier belongs to the second list; and the fifth information is used for determining a judgment on whether the first area identifier belongs to the first list or a judgment on whether the first area identifier belongs to the second list.

In one subembodiment, the first transceiver 1301 further transmits target information and receives feedback information; the target information is the third information, or the target information is the fourth information; the transmitting of the target information is used for triggering the receiving of the feedback information.

In one subembodiment, the second receiver 1302 determines a first time-frequency resource set and a second time-frequency resource set; the UE monitors paging information in the first time-frequency resource set of the first serving cell and the second time-frequency resource set of the second serving cell respectively, location information of the UE is used for determining the first time-frequency resource set, and the second time-frequency resource set is unrelated to the location information of the UE.

In one subembodiment, the area identifier corresponding to the first serving cell is equal to the area identifier corresponding to the second serving cell.

In one subembodiment, the first receiver 1301 includes at least the former three of the receiver 456, the receiving processor 452, the TA processor 441 or the controller/processor 490 illustrated in Embodiment 4.

In one subembodiment, the second receiver 1302 includes at least the former two of the receiver, the receiving processor 452, or the controller/processor 490 illustrated in Embodiment 4.

In one subembodiment, the first transceiver 1303 includes at least the former three of the receiver/transmitter 456, the receiving processor 452, the transmitting processor 455, the TA processor or the controller/processor 490 illustrated in Embodiment 4.

Embodiment 14

Figure 14:
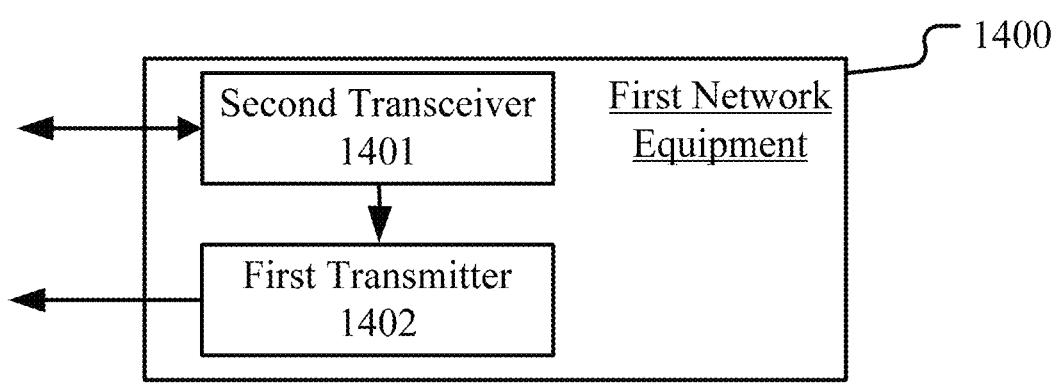
FIG. 14 is a structure block diagram illustrating a processing device in a first base station according to one embodiment of the disclosure.

Embodiment 14 illustrates an example of a structure block diagram of a processing device in a first network equipment, as shown in FIG. 14. In FIG. 14, the processing device 1400 in the first network equipment mainly includes a second transceiver 1401 and a first transmitter 1402.

The second transceiver 1401 transmits first information, the first information indicating a first list and a second list.

The first transmitter 1402 transmits paging information in a first serving cell.

In Embodiment 14, an area identifier corresponding to the first serving cell belongs to the first list, and an area identifier corresponding to a second serving cell belongs to the second list; the first list and the second list include Q1 area identifier(s) and Q2 area identifier(s) respectively, the Q1 and the Q2 are positive integers respectively; the first list and the second list can be updated separately; a receiver of the first information includes a first terminal; the first network equipment is related to the first serving cell.

In one subembodiment, the second transceiver 1401 further receives target information and transmits feedback information; the target information is third information, or the target information is fourth information; the receiving of the target information is used for triggering the transmitting of the feedback information; when the first area identifier is outside the first list, the target information is the third information; when the first area identifier is outside the second list, the target information is the fourth information; the first list and the second list include Q1 area identifier(s) and Q2 area identifier(s) respectively, the Q1 and the Q2 are positive integers respectively; and the first list and the second list can be updated separately.

In one subembodiment, the first transmitter 1402 configures a first time-frequency resource set; the first terminal monitors paging information in the first time-frequency resource set of the first serving cell, and location information of the first terminal is used for determining the first time-frequency resource set.

In one subembodiment, the area identifier corresponding to the first serving cell is equal to the area identifier corresponding to the second serving cell.

In one subembodiment, the second transceiver 1401 includes at least the former three of the receiver/transmitter 416, the transmitting processor 415, the receiving processor 412, the controller/processor 440 or the TA processor 471 illustrated in Embodiment 4.

In one subembodiment, the first transmitter 1402 includes at least the former two of the transmitter 416, the transmitting processor 415 or the controller/processor 440 illustrated in Embodiment 4.

In one subembodiment, the second transceiver 1401 acquires the first information from an MME, and transmits the first information to the first terminal.

In one affiliated embodiment of the above subembodiment, the first information is transparent for the first network equipment.

Embodiment 15

Figure 15:
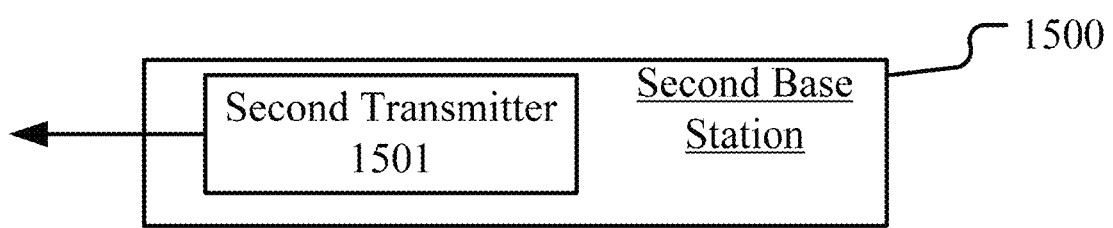
FIG. 15 is a structure block diagram illustrating a processing device in a second base station according to one embodiment of the disclosure.

Embodiment 15 illustrates an example of a structure block diagram of a processing device in a second base station, as shown in FIG. 15. In FIG. 15, the processing device 1500 in the second base station mainly includes a second transmitter 1501.

The second transmitter 1501 transmits paging information in a second serving cell.

In Embodiment 15, first information indicates a first list and a second list, an area identifier corresponding to a first serving cell belongs to the first list, and an area identifier corresponding to the second serving cell belongs to the second list; the first list and the second list include Q1 area identifier(s) and Q2 area identifier(s) respectively, the Q1 and the Q2 are positive integers respectively; the first list and the second list can be updated separately; a receiver of the first information includes a first terminal; a first network equipment is related to the first serving cell; and the first network equipment transmits the first information.

In one subembodiment, the second transmitter 1501 configures a second time-frequency resource set; the first terminal monitors paging information in the second time-frequency resource set of the second serving cell, and the second time-frequency resource set is unrelated to location information of the first terminal.

In one subembodiment, the area identifier corresponding to the first serving cell is equal to the area identifier corresponding to the second serving cell.

In one subembodiment, the second transmitter 1501 includes at least the former two of the transmitter 416, the transmitting processor 415, the TA processor 471 or the controller/processor 440 illustrated in Embodiment 4.

Embodiment 16

Figure 16:
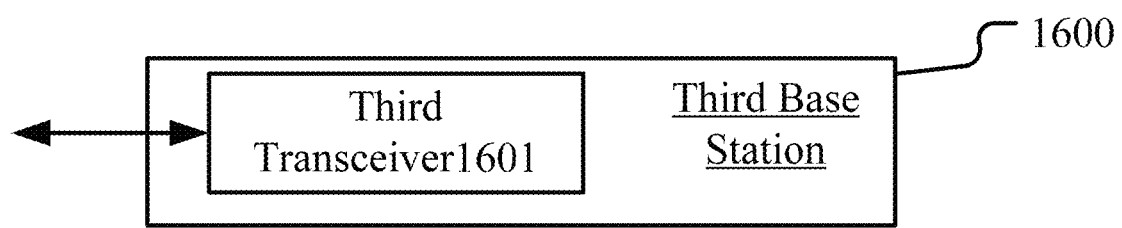
FIG. 16 is a structure block diagram illustrating a processing device in a third base station according to one embodiment of the disclosure.

Embodiment 16 illustrates an example of a structure block diagram of a processing device in a third base station, as shown in FIG. 16. In FIG. 16, the processing device 1600 in the third base station mainly includes a third transceiver 1601.

The third transceiver 1601 transmits second information, the second information indicating a first area identifier, and transmits fifth information.

In Embodiment 16, when the first area identifier is outside a first list, the third base station receives third information; when the first area identifier is outside a second list, the third base station receives fourth information; the first list and the second list include Q1 area identifier(s) and Q2 area identifier(s) respectively, the Q1 and the Q2 are positive integers respectively; the first list and the second list can be updated separately; and the fifth information is used for determining a judgment on whether the first area identifier belongs to the first list or a judgment on whether the first area identifier belongs to the second list.

In one subembodiment, the third transceiver 1601 receives target information and transmits feedback information; the target information is third information, or the target information is fourth information; and the receiving of the target information is used for triggering the transmitting of the feedback information.

In one subembodiment, the third transceiver 1601 includes at least the former four of the receiver/transmitter 416, the transmitting processor 415, the receiving processor 412, the TA processor 471 or the controller/processor 440 illustrated in Embodiment 4.

In one subembodiment, the third transceiver 1601 acquires the second information and the fifth information from an MME, and transmits the second information and the fifth information to the first terminal.

In one affiliated embodiment of the above subembodiment, the second information and the fifth information are transparent for the third base station.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE or terminal in the present disclosure includes but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, etc. The base station in the present application includes but not limited to macro-cellular base stations, micro-cellular base stations, home base stations, relay base station and radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:
   receiving first information, the first information indicating a first list and a second list; and
   monitoring paging information in at least one of a first serving cell and a second serving cell;
   wherein an area identifier corresponding to the first serving cell belongs to the first list, and an area identifier corresponding to the second serving cell belongs to the second list; the first list and the second list comprise Q1 area identifier(s) and Q2 area identifier(s) respectively, the Q1 and the Q2 are positive integers respectively; and the first list and the second list can be updated separately.

2. The method according to claim 1, comprising:
   receiving second information, the second information indicating a first area identifier; and
   judging at least one of whether the first area identifier belongs to the first list or whether the first area identifier belongs to the second list;
   wherein when the first area identifier is outside the first list, the receiving of the second information triggers a transmitting of third information; when the first area identifier is outside the second list, the receiving of the first information triggers a transmitting of fourth information.

3. The method according to claim 2, comprising:
   transmitting target information; and
   receiving feedback information;
   wherein the target information is the third information, or the target information is the fourth information; the transmitting of the target information is used for triggering the receiving of the feedback information.

4. The method according to claim 1, comprising:
   receiving fifth information;
   wherein the UE judges only one of whether the first area identifier belongs to the first list or whether the first area identifier belongs to the second list; and the fifth information is used for determining a judgment on whether the first area identifier belongs to the first list or a judgment on whether the first area identifier belongs to the second list.

5. The method according to claim 1, comprising:
   determining a first time-frequency resource set and a second time-frequency resource set;
   wherein the UE monitors paging information in the first time-frequency resource set of the first serving cell and the second time-frequency resource set of the second serving cell respectively, location information of the UE is used for determining the first time-frequency resource set, and the second time-frequency resource set is unrelated to the location information of the UE;
   or, wherein the area identifier corresponding to the first serving cell is equal to the area identifier corresponding to the second serving cell.

6. A method in a first network equipment for wireless communication, comprising:
   transmitting first information, the first information indicating a first list and a second list; and
   transmitting paging information in a first serving cell;
   wherein an area identifier corresponding to the first serving cell belongs to the first list, and an area identifier corresponding to a second serving cell belongs to the second list; the first list and the second list comprise Q1 area identifier(s) and Q2 area identifier(s) respectively, the Q1 and the Q2 are positive integers respectively; the first list and the second list can be updated separately; a receiver of the first information comprises a first terminal; the first network equipment is related to the first serving cell.

7. The method according to claim 6, comprising:
   receiving target information; and
   transmitting feedback information;
   wherein the target information is third information, or the target information is fourth information; the receiving of the target information is used for triggering the transmitting of the feedback information; when the first area identifier is outside the first list, the target information is the third information; when the first area identifier is outside the second list, the target information is the fourth information; the first list and the second list comprise Q1 area identifier(s) and Q2 area identifier(s) respectively, the Q1 and the Q2 are positive integers respectively; and the first list and the second list can be updated separately.

8. The method according to claim 6, comprising:
   configuring a first time-frequency resource set;
   wherein the first terminal monitors paging information in the first time-frequency resource set of the first serving cell, and location information of the first terminal is used for determining the first time-frequency resource set;
   or, wherein the area identifier corresponding to the first serving cell is equal to the area identifier corresponding to the second serving cell.

9. A UE for wireless communication, comprising:
   a first receiver, to receive first information, the first information indicating a first list and a second list; and
   a second receiver, to monitor paging information in at least one of a first serving cell and a second serving cell;
   wherein an area identifier corresponding to the first serving cell belongs to the first list, and an area identifier corresponding to the second serving cell belongs to the second list; the first list and the second list comprise Q1 area identifier(s) and Q2 area identifier(s) respectively, the Q1 and the Q2 are positive integers respectively; and the first list and the second list can be updated separately.

10. The UE according to claim 9, comprising:
    a first transceiver, to receive second information, the second information indicating a first area identifier, and to judge at least one of whether the first area identifier belongs to the first list or whether the first area identifier belongs to the second list;
    wherein when the first area identifier is outside the first list, the receiving of the second information triggers a transmitting of third information; when the first area identifier is outside the second list, the receiving of the first information triggers a transmitting of fourth information.

11. The UE according to claim 10, wherein the first transceiver transmits target information, and the first transceiver receives feedback information; the target information is the third information, or the target information is the fourth information; the transmitting of the target information is used for triggering the receiving of the feedback information.

12. The UE according to claim 10, wherein the first transceiver receives fifth information; the UE judges only one of whether the first area identifier belongs to the first list or whether the first area identifier belongs to the second list; and the fifth information is used for determining a judgment on whether the first area identifier belongs to the first list or a judgment on whether the first area identifier belongs to the second list.

13. The UE according to claim 9, wherein the second receiver determines a first time-frequency resource set and a second time-frequency resource set; the UE monitors paging information in the first time-frequency resource set of the first serving cell and the second time-frequency resource set of the second serving cell respectively, location information of the UE is used for determining the first time-frequency resource set, and the second time-frequency resource set is unrelated to the location information of the UE;

or, wherein the area identifier corresponding to the first serving cell is equal to the area identifier corresponding to the second serving cell.

14. A first network equipment for wireless communication, comprising:
 a second transceiver, to transmit first information, the first information indicating a first list and a second list; and
 a first transmitter, to transmit paging information in a first serving cell;
 wherein an area identifier corresponding to the first serving cell belongs to the first list, and an area identifier corresponding to a second serving cell belongs to the second list; the first list and the second list comprise Q1 area identifier(s) and Q2 area identifier(s) respectively, the Q1 and the Q2 are positive integers respectively; the first list and the second list can be updated separately; a receiver of the first information comprises a first terminal; the first network equipment is related to the first serving cell.

15. The first network equipment according to claim 14, wherein the second transceiver receives target information, and the second transceiver transmits feedback information; the target information is third information, or the target information is fourth information; the receiving of the target information is used for triggering the transmitting of the feedback information; when the first area identifier is outside the first list, the target information is the third information; when the first area identifier is outside the second list, the target information is the fourth information; the first list and the second list comprise Q1 area identifier(s) and Q2 area identifier(s) respectively, the Q1 and the Q2 are positive integers respectively; and the first list and the second list can be updated separately.

16. The first network equipment according to claim 14, wherein the first transmitter configures a first time-frequency resource set; the first terminal monitors paging information in the first time-frequency resource set of the first serving cell, and location information of the first terminal is used for determining the first time-frequency resource set;

or, wherein the area identifier corresponding to the first serving cell is equal to the area identifier corresponding to the second serving cell.

\* \* \* \* \*